US007862183B2

United States Patent
Frahm et al.

(10) Patent No.: US 7,862,183 B2
(45) Date of Patent: Jan. 4, 2011

(54) SPECKLE REDUCTION USING A TUNABLE LIQUID LENS

(75) Inventors: Robert E. Frahm, Flemington, NJ (US); Omar D. Lopez, Scotch Plains, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 537 days.

(21) Appl. No.: 11/872,751

(22) Filed: Oct. 16, 2007

(65) Prior Publication Data

US 2009/0096999 A1    Apr. 16, 2009

(51) Int. Cl.
*G03B 21/14* (2006.01)
(52) U.S. Cl. .......................... 353/101; 353/87; 353/99; 353/100; 353/122; 359/228; 359/665; 359/620; 359/666; 359/245
(58) Field of Classification Search ................. 353/101, 353/87, 99, 100, 122; 359/665, 620, 666, 359/245, 253, 813, 814, 819, 822, 827, 228
See application file for complete search history.

(56) References Cited

U.S. PATENT DOCUMENTS

| 4,012,843 | A | 3/1977 | Harada et al. | |
|---|---|---|---|---|
| 6,014,259 | A | 1/2000 | Wolstadter | |
| 6,538,823 | B2* | 3/2003 | Kroupenkine et al. | 359/665 |
| 6,545,815 | B2* | 4/2003 | Kroupenkine et al. | 359/665 |
| 6,545,816 | B1 | 4/2003 | Kroupenkine et al. | |
| 6,647,029 | B1* | 11/2003 | Okazaki | 372/20 |
| 6,847,493 | B1* | 1/2005 | Davis et al. | 359/665 |
| 6,891,682 | B2* | 5/2005 | Aizenberg et al. | 359/738 |
| 6,936,196 | B2* | 8/2005 | Chandross et al. | 264/1.36 |
| 2008/0055711 | A1* | 3/2008 | Kolodner et al. | 359/296 |
| 2008/0278692 | A1* | 11/2008 | Sanders et al. | 353/38 |

FOREIGN PATENT DOCUMENTS

| GB | 2 436 676 A | 10/2007 |
|---|---|---|
| WO | WO 2006/017129 A2 | 2/2006 |
| WO | WO 2006/024998 A2 | 3/2006 |
| WO | WO 2007/024473 A1 | 3/2007 |

OTHER PUBLICATIONS

"Tunable Semiconductor Lasers: A Tutorial," by Larry A. Coldren et al., Journal of Lightwave Technology, vol. 22, No. 1, Jan. 2004 IEEE, pp. 193-202.

(Continued)

*Primary Examiner*—William C Dowling
*Assistant Examiner*—Sultan Chowdhury
(74) *Attorney, Agent, or Firm*—Mendelsohn, Drucker & Associates, P.C.; Yuri Gruzdkov; Steve Mendelsohn

(57) ABSTRACT

A representative embodiment of the invention provides a projection system having a laser source that incorporates a tunable liquid lens and a spatial light modulator adapted to modulate light generated by the laser source to project an image on a viewing screen. The tunable liquid lens is adapted to vary focal length, alignment or position with respect to an optical element that is external to the lens, ability to diffuse light, and/or polarization rotation angle.

20 Claims, 4 Drawing Sheets

OTHER PUBLICATIONS

"E-Beam DFB LD Fabrication Services," OEpic, Inc, Apr. 2003, [Retrieved on Jul. 4, 2007], Retrieved from the Internet: <URL: http://www.oepic.com> (4 pages).

"Tunable Liquid Microlens," by T. Krupenkin et al., Applied Physics Letters, vol. 82, No. 3, Jan. 20, 2003, pp. 316-318.

"From Rolling Ball to Complete Wetting: The Dynamic Tuning of Liquids on Nanostructured Surfaces," by Tom N. Krupenkin et al., American Chemical Society, Langmuir, vol. 20, No. 10, 2004, pp. 3824-3827.

* cited by examiner

100

202

320

400

500

SPECKLE REDUCTION USING A TUNABLE LIQUID LENS

BACKGROUND OF THE INVENTION

1. Field of the Invention

The present invention relates to laser projection systems.

2. Description of the Related Art

The use of lasers in projection systems enables the creation of vibrant images with extensive color coverage that may be difficult to achieve with conventional (non-laser) light sources. However, one significant obstacle to laser image projection is the speckle phenomenon. Speckle arises when coherent light scattered from a rough surface, such as a screen, is detected by an intensity detector (e.g., a human eye) that has a finite aperture (e.g., a pupil). The finite aperture leads to quantization of the detected image into a mosaic of spots. If light scattered from a spot on the screen interferes destructively at the aperture, then that spot appears as a relatively dark spot in the perceived image. On the other hand, if light scattered from a spot interferes constructively at the aperture, then that spot appears as a relatively bright spot in the perceived image. This apparent spot-to-spot intensity variation visible even when the screen is uniformly lit by the laser is referred to as speckle. Since speckle superimposes a granular structure on the perceived image, which both degrades the image sharpness and annoys the viewer, speckle reduction is highly desirable.

SUMMARY OF THE INVENTION

A representative embodiment of the invention provides a projection system having a laser source that incorporates a tunable liquid lens and a spatial light modulator adapted to modulate light generated by the laser source to project an image on a viewing screen. The system is adapted to vary the focal length, alignment, light-diffusing ability, and/or light-polarizing properties of the tunable liquid lens to mitigate speckle in the projected image.

According to one embodiment, an apparatus comprises: (A) a light source having a tunable liquid lens and (B) a spatial light modulator (SLM) adapted to modulate light generated by the light source so that the modulated light projects an image on an imaging surface. The tunable liquid lens is adapted to vary at least one of the lens' characteristics to mitigate speckle in the projected image.

According to another embodiment, a method of reducing speckle of the invention comprises the steps of: (A) illuminating a spatial light modulator (SLM) with light generated by a light source having a tunable liquid lens; (B) modulating said light with the SLM so that the modulated light projects an image on an imaging surface; and (C) varying at least one of the lens' characteristics to mitigate speckle in the projected image.

BRIEF DESCRIPTION OF THE DRAWINGS

Other aspects, features, and benefits of the present invention will become more fully apparent from the following detailed description, the appended claims, and the accompanying drawings in which:

DETAILED DESCRIPTION

Figure 1:
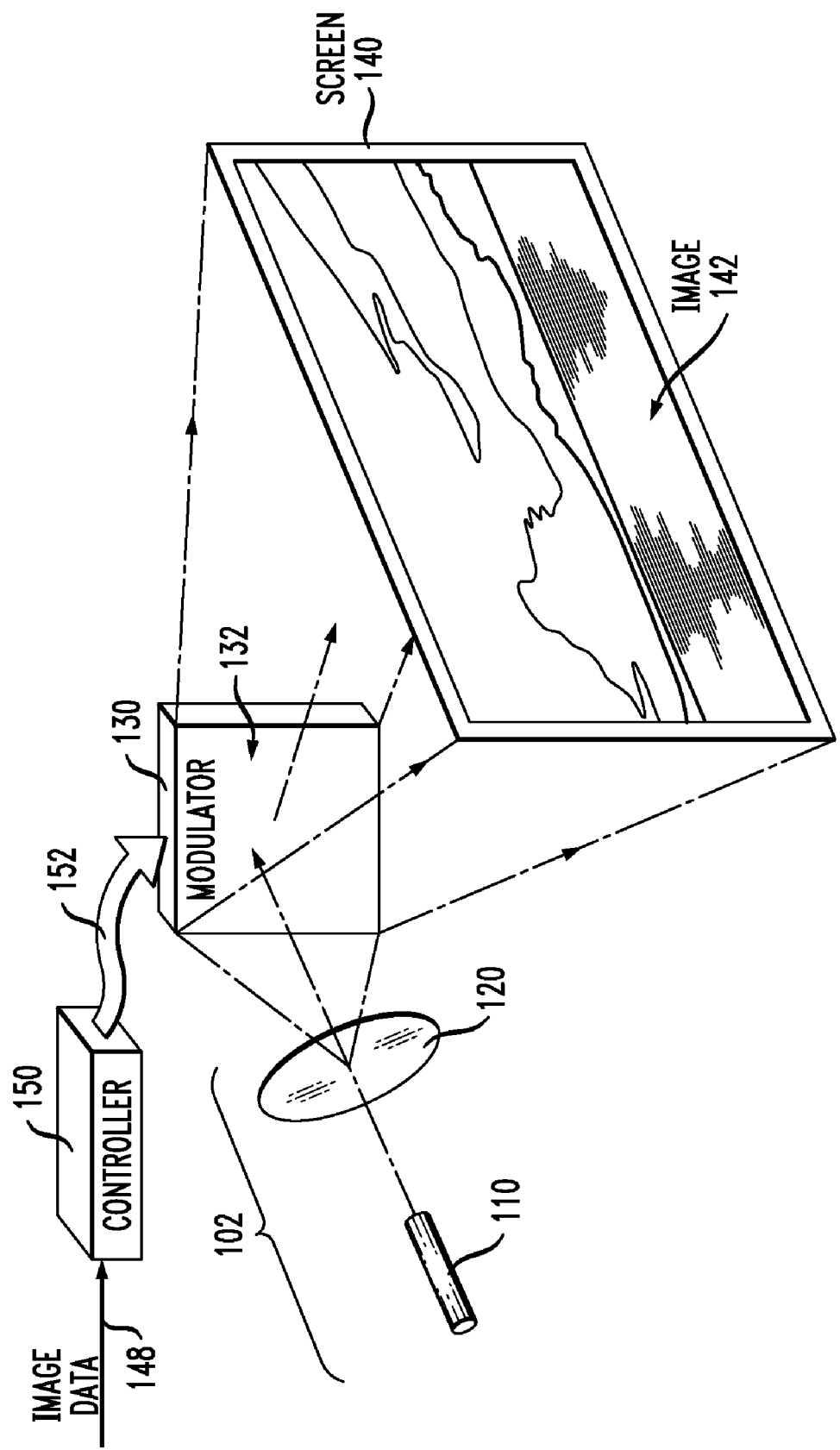
FIG. 1 shows a block diagram of a projection system according to one embodiment of the invention.

Herein, speckle reduction typically involves averaging two or more independent speckle configurations within the spatial and/or temporal resolution of the detector, such as the human eye. For the human eye, the averaging time is related to a physiological parameter called the flicker fusion threshold or flicker fusion rate. More specifically, light that is pulsating at a rate lower than the flicker fusion rate is perceived by humans as flickering. In contrast, light that is pulsating at a rate higher than the flicker fusion rate is perceived as being steady. Flicker fusion rates vary from person to person and also depend on the individual's level of fatigue, the brightness of the light source, and the area of the retina that is being used to observe the light source. Very few people perceive flicker at a rate higher than about 75 Hz. In cinema and television, frame delivery rates between 20 and 60 Hz, e.g., 30 Hz, are normally used. For the overwhelming majority of people, these rates are higher than their flicker fusion rates.

Independent speckle configurations can be produced using diversification of propagation angle, polarization, phase, and/or wavelength of the illuminating laser beam. One approach to achieving angle diversity is the use of a time-varying (e.g., vibrating) diffuser that causes the projection optics to sequentially illuminate sub-resolution areas inside the detector resolution spot at a rate higher than the flicker fusion rate. The sequential illumination effectively destroys the spatial coherence among the sub-resolution areas in the resolution spot, which suppresses interference effects within the resolution spot and reduces speckle contrast. Polarization diversity may be achieved, e.g., by using a projection screen that exhibits good depolarizing characteristics. A polarized laser beam incident on a depolarizing surface experiences depolarization due to multiple light scatterings. The resulting speckle pattern can be decomposed into two patterns corresponding to two orthogonal polarization states. Since orthogonal polarization states are independent of one another, a corresponding speckle-contrast reduction occurs. Wavelength and/or phase diversity reduces speckle contrast because speckle is an interference phenomenon that depends on the wavelength and phase of the illuminating light. For example, if two lasers whose wavelengths differ by an amount that is indistinguishable to the human eye are used to produce an image, then the image has a superposition of two independent speckle configurations, and the overall speckle contrast is reduced accordingly without changing the color perception of the image. Because angle, polarization, phase, and wavelength diversities are independent of one another, speckle-reduction techniques relying on individual diversities can be combined and used simultaneously and/or complementarily. The resulting cumulative speckle-contrast reduction factor may be as large as the product of individual speckle-contrast reduction factors of the individual diversities employed by the speckle-reduction technique.

FIG. 1 shows a block diagram of a projection system 100 according to one embodiment of the invention. System 100 has a light source 102 having a laser 110 and a lens 120. Laser 110 illuminates through lens 120 a spatial light modulator (SLM) 130. SLM 130 is configured with a spatial modulation pattern 132 that encodes the image to be projected. For example, pattern 132 may be an intensity modulation pattern that represents the image. Light that has been spatially modulated by SLM 130 is projected onto a screen 140 to generate an image 142 corresponding to pattern 132. A controller 150 generates a control signal 152 to configure SLM 130 with pattern 132 based on image data 148.

In various embodiments, system 100 can include various features and elements disclosed in commonly owned U.S. patent application Ser. No. 11/681,376 (Aksyuk 46-80-11-13), Ser. No. 11/713,207 (Giles 81-13-15), and Ser. No. 11/713,155 (Aksyuk 45-10-12-14), all of which are incorporated herein by reference in their entirety. For example, certain SLMs disclosed in U.S. patent application Ser. No. 11/713,207 (Giles 81-13-15) and Ser. No. 11/713,155 (Aksyuk 45-10-12-14) may be used as SLM 130. These patent applications also include disclosures of representative operating procedures that may be applied to system 100.

In some embodiments, system 100 may generate images perceived as being multi-colored. In such embodiments, light source 102 illuminates SLM 130 using a temporal sequence of light beams of different colors (e.g., red, green, and blue). To generate the temporal sequence of different light colors, light source 102 may incorporate three or more appropriate integrated laser sources (not explicitly shown in FIG. 1), each having a fixed wavelength. Alternatively, laser 110 may be a tunable laser, e.g., capable of sequentially generating red, green, and blue light beams. Image data 148 specify a multi-color image by having two, three, or more subsets of image data, each subset specifying a corresponding monochromatic sub-image. When the individual monochromatic sub-images are sequentially projected onto screen 140 at a rate higher than the flicker fusion rate, the viewer's eyes fuse the sequence of monochromatic sub-images to form the corresponding perceived multi-color image.

Figure 2:
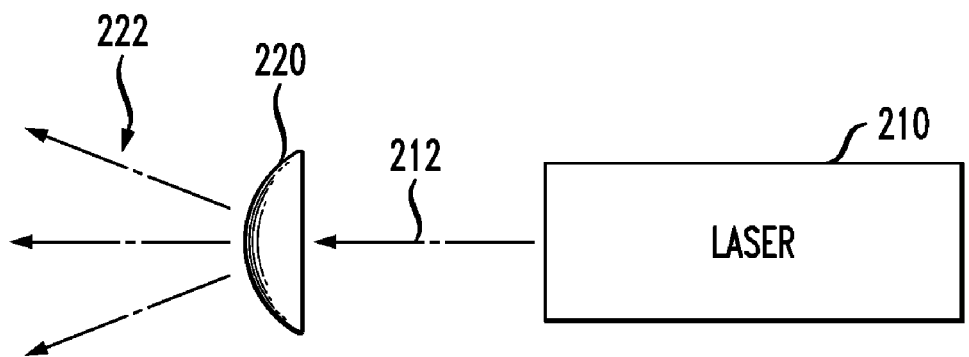
FIG. 2 shows a light source that can be used in the projection system shown in FIG. 1 according to one embodiment of the invention.

FIG. 2 shows a light source 202 that can be used as light source 102 according to one embodiment of the invention. Light source 202 has a laser 210 and a tunable liquid lens 220. Laser 210 generates an optical beam 212 and directs it toward lens 220. After passing through lens 220, beam 212 is transformed into an output beam 222 that can be directed, e.g., toward SLM 130 (FIG. 1). In various embodiments, liquid lens 220 has one or more of the following characteristics: (i) variable focal length, (ii) variable alignment with laser 210, (iii) variable light-diffusing properties, and (iv) variable light-polarizing properties.

In one embodiment, lens 220 is able to vary its focal length by changing its shape. If light source 202 is used as light source 102, then the focal-length variability of lens 220 can be used to mitigate speckle, for example, as follows. Lens 220 is configured to vary its focal length between a first value, $f_1$, and a second value, $f_2$, at a rate higher than the flicker fusion rate. The values of $f_1$ and $f_2$ are selected so that, for the focal lengths between $f_1$ and $f_2$, image 142 remains substantially in focus. The latter is true, e.g., when $|f_1-f_2| \ll f_1, f_2$. Since each focal length produces a respective quasi-independent speckle configuration on screen 140, the focal-length variation produces a sequence of quasi-independent speckle configurations. Averaging of this sequence by the human eye then results in a corresponding speckle-contrast reduction. Due to the fact that the focal length of lens 220 varies by a relatively small amount, the speckle-contrast reduction is achieved substantially without degradation of the perceived sharpness of image 142.

In another embodiment, lens 220 is adapted to vary its alignment with laser 210 and position of the center of mass with respect to the laser. Herein, the term "alignment" refers to the relative orientation of the axis of lens 220 with respect to the axis of the beam generated by laser 210. The term "position" refers to the three spatial (X, Y, and Z) coordinates of the center of mass of lens 220.

If light source 202 is used as light source 102, then the variability of the position of lens 220 can be used to mitigate speckle, for example, as follows. Lens 220 is configured to translate within a plane orthogonal to beam 212 so that the location of the center axis of the beam on the lens' surface periodically or non-periodically shifts by a distance that is on the order of the beam's wavelength at a rate higher than the flicker fusion rate. This motion results in a corresponding movement of image 142 on screen 140, which produces thereon a sequence of quasi-independent speckle configurations. Averaging of this sequence by the human eye then results in a corresponding speckle-contrast reduction. Due to the fact that the movement of image 142 has relatively small amplitude, the speckle-contrast reduction is achieved without significant degradation of the perceived sharpness of the image. In general, any speckle mitigation technique seeks a compromise between achieving a desired level of speckle-contrast reduction and avoiding a significant loss of resolution. As long as the perceived sharpness of the image is not significantly detrimentally affected, some loss of resolution can typically be tolerated.

Alternatively or in addition, lens 220 can be periodically or non-periodically tilted by a relatively small angle with respect to the center axis of the beam 212 at a rate higher than the flicker fusion rate. This motion results in a corresponding movement of image 142 on screen 140, which produces thereon a sequence of quasi-independent speckle configurations. Averaging of this sequence by the human eye then results in a corresponding speckle-contrast reduction.

In yet another embodiment, lens 220 has variable ability to diffuse light. Herein, the term "ability to diffuse light" refers to the ability to transform a ray of light into a diverging cone of light, which cone may or may not be axially symmetric in terms of the light intensity distribution within the cone. A collimated beam of light, such as beam 212, can generally be considered as consisting of a plurality of parallel rays, each of which can be individually diffused by a light-diffusing object, such as lens 220. The manner in which each ray is diffused is typically different for different rays and is determined by the local light-diffusing characteristics of the light-diffusing object along the ray propagation path within that object.

If light source 202 is used as light source 102, then the variability of the ability to diffuse light of lens 220 can be used to mitigate speckle, for example, as follows. Lens 220 performs two functions: (i) that of a regular lens and (ii) that of a light diffuser. The latter function is used to effect speckle mitigation. More specifically, lens 220, in its capacity as a light diffuser, introduces wavefront distortions that effectively divide beam 222 into mutually quasi-incoherent optical sub-beams. If lens 220 is configured to vary its ability to diffuse light in a periodic or non-periodic manner at a rate higher than the flicker fusion rate, then the partition of beam 222 into sub-beams varies accordingly to create a sequence of quasi-independent speckle configurations. Averaging of this sequence by the human eye then results in a corresponding speckle-contrast reduction.

In still another embodiment, lens 220 has variable ability to rotate light polarization. If light source 202 is used as light source 102, then the variable ability of lens 220 to rotate light polarization can be used to mitigate speckle, for example, as follows. Lens 220 performs two functions: (i) that of a regular lens and (ii) that of a polarization rotator. The latter function is used to effect speckle mitigation. More specifically, lens 220, in its capacity as a polarization rotator, rotates the polarization of beam 222, with the amount of rotation changing in a periodic or non-periodic manner at a rate higher than the flicker fusion rate. The varying polarization of beam 222 creates polarization diversity and produces a sequence of corresponding quasi-independent speckle configurations. Averaging of this sequence by the human eye then results in a corresponding speckle-contrast reduction.

Figure 3:
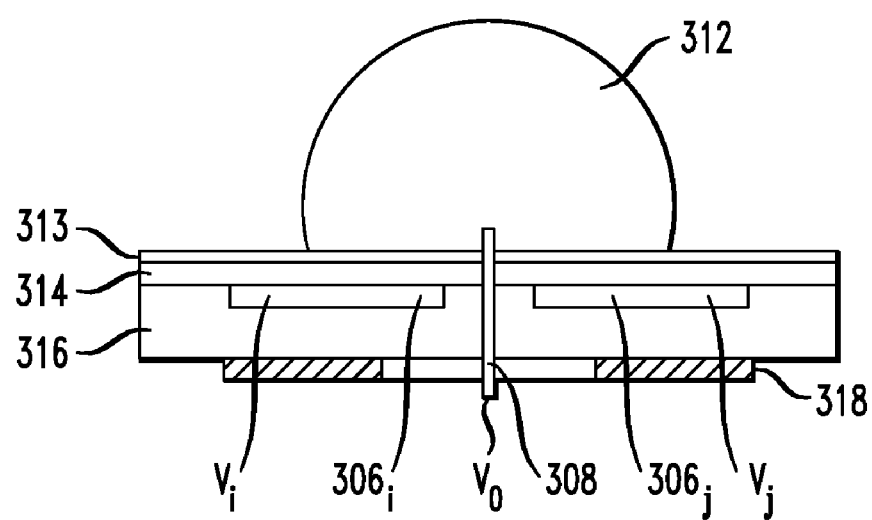
FIG. 3 shows a side cross-sectional view of a tunable liquid lens that can be used in the light source of FIG. 2 according to one embodiment of the invention.

FIG. 3 shows a side cross-sectional view of a tunable liquid lens 320 that can be used as tunable liquid lens 220 according to one embodiment of the invention. Lens 320 has a droplet 312 disposed on a dielectric, optically transparent layer 314 having a relatively thin coating 313, e.g., of a hydrophobic fluoropolymer, such as Cytop. In various embodiments, droplet 312 contains one or more of: (i) an electrically conductive fluid, (ii) a suspension of particles, and (iii) a liquid-crystal material. For example, the electrically conductive fluid can be a water-soluble alcohol, an electrolytic salt (e.g., potassium chloride) solution, or a molten salt; the suspension of particles can include nano-particles, quantum dots, or sub-micron to several-micron sized polystyrene spheres; and the liquid-crystal material can be a nematic or ferro-electric liquid crystal whose optical birefringence can be controlled by an external electric field. Coating 313 preferably provides a desired contact angle for droplet 312 and low contact-angle hysteresis. More details on the contact-angle control can be found, e.g., in a journal article by Krupenkin, et al., published in Langmuir, 2004, vol. 20, pp. 3824-3827, the teachings of which are incorporated herein by reference. Layer 314 has a relatively high dielectric breakdown point that is appropriate for avoiding such breakdown during the intended application of control voltages (see the description below). In various embodiments, the optically transparent substrate formed by layers 316, 314, and 313 can be flat or curved as needed to facilitate appropriate positioning of droplet 312 on its surface.

Lens 320 further has a plurality of optically transparent lateral electrodes 306 and a central electrode 308. Only two of electrodes 306, i.e., electrodes 306i and 306j, are visible in the cross-section shown in FIG. 3. Electrodes 306 are electrically isolated from droplet 312 by layer 314, and also electrically isolated from one another. Central electrode 308 is in electrical contact with droplet 312. Each of electrodes 306 and 308 is coupled to a variable voltage source (not shown in FIG. 3) that is configured to apply respective voltages $V_i$-$V_j$ to electrodes 306 and voltage $V_0$ to central electrode 308. Electrodes 306 and 308 and layer 314 are supported by a substrate 316. In one embodiment, optically transparent electrodes 306 are formed from indium tin oxide.

In one embodiment, lens 320 has an optional piezoelectric sonic transducer 318 attached to substrate 316. Transducer 318 is adapted to send sound (e.g., ultrasound) energy through substrate 316, electrodes 306, and layer 314 into droplet 312 to agitate particles (if any) contained therein. In one embodiment, transducer 318 has a ring shape that enables the transducer to transmit light through its middle portion. In another embodiment, one or more of electrodes 306 and 308 can be used as a type of sonic transducer.

If droplet 312 comprises a suspension of particles, then transducer 318 can be used to agitate those particles and vary their distribution within the droplet. Alternatively or in addition, an ac voltage can be applied to electrodes 306 to produce or assist with the particle agitation. Such ac voltage can produce or assist with the particle agitation because irregularly shaped particles tend to orient themselves so that the long axis of the particle is substantially parallel to the local electric field vector. The resulting changes in the distribution of said particles within droplet 312 modulate the amount of light diffusion produced by lens 320. Note that light diffusing is a method of providing angle diversity. In one embodiment, the particles contained in droplet 312 range in size from about 100 nm to about 1 μm.

Figure 4:
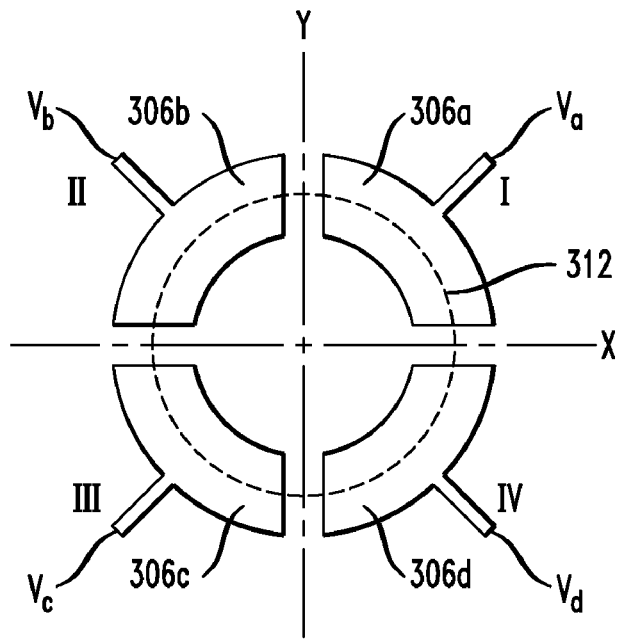
FIG. 4 shows a configuration of electrodes that can be used in the lens shown in FIG. 3 according to one embodiment of the invention.

FIG. 4 shows a configuration 400 of electrodes 306 that can be used in lens 300 according to one embodiment of the invention. More specifically, FIG. 4 shows a top view of electrodes 306, with droplet 312 indicated by the dashed line. Configuration 400 has four lateral electrodes 306a-d adapted to receive voltages $V_a$-$V_d$, respectively. Center electrode 308 (not shown in FIG. 4) is located at the origin (intersection) of coordinate axes X and Y. If droplet 312 comprises an electrically conductive fluid, then configuration 400 can be used to vary the focal length of lens 320 and the lens' center of mass position with respect to external optical elements, for example, as follows.

If no or equal voltages (i.e., $V_a=V_b=V_c=V_d=V_0$) are applied to electrodes 306a-d and 308, then droplet 312 is centered relative to electrodes 306, e.g., as shown in FIG. 4. If equal voltages are applied to electrodes 306a-d and a different voltage is applied to electrode 308 (i.e., $V_a=V_b=V_c=V_d\neq V_0$), then droplet 312 spreads equally within quadrants I-IV, thereby changing the shape of the droplet. The spreading of droplet 312 decreases its curvature and increases the focal length of lens 320 accordingly.

The lateral position of droplet 312 along the X- and Y-axes can be changed using differential biasing of electrodes 306a-d and 308. For example, by applying the following exemplary pattern of voltages: $V_a=V_c=V_0<V_d<V_b$, droplet 312 is moved toward the higher voltage electrode 306b in quadrant II. By applying a different pattern of voltages to the electrodes, droplet 312 can be steered to different positions within quadrants I-IV. Change in the position of droplet 312 results in a corresponding movement of the focal point of lens 320.

Figure 5:
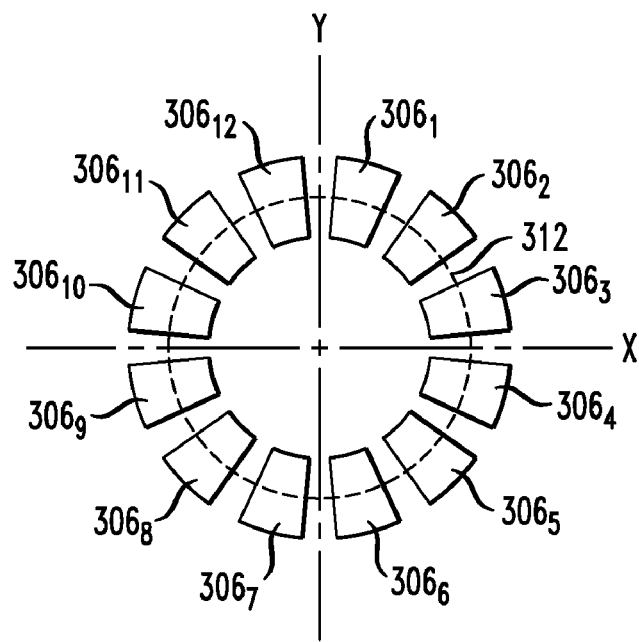
FIG. 5 shows a configuration of electrodes that can be used in the lens shown in FIG. 3 according to another embodiment of the invention.

FIG. 5 shows a configuration 500 of electrodes 306 that can be used in lens 300 according to another embodiment of the invention. More specifically, FIG. 5 shows a top view of electrodes 306, with droplet 312 indicated by the dashed line. Configuration 500 has twelve electrodes $306_1$-$306_{12}$ adapted to receive voltages $V_1$-$V_{12}$, respectively. If droplet 312 comprises a nematic liquid-crystal material, then configuration 500 can be used to vary light-polarizing properties of lens 320, for example, as follows.

If voltages $V_1=-V_7$ are applied to electrodes $306_1$ and $306_7$, respectively, and a zero voltage is applied to the remaining electrodes 306, then the electric-field lines within droplet 312 are primarily parallel to the line that connects the two active electrodes and passes through the origin of coordinate axes X and Y. This electric field interacts with the nematic liquid-crystal material of droplet 312 to align its molecules along those electric-field lines. The aligned molecules act as a polarization rotator that rotates the polarization of light (e.g., beam 212 of FIG. 2) directed through droplet 312 to orient it according to the molecule alignment direction. The electric-field orientation and, therefore, the alignment direction can be changed, e.g., by applying the above-described voltage pattern to a different selection of electrodes 306. For example, the respective opposite electrode pairs (i.e., electrodes $306_k$ and $306_{k+6}$, where k=1, 2, . . . , 6) can be sequentially activated to substantially rotate the alignment direction and therefore the polarization of the output beam. One skilled in the art will appreciate that a different electrode-activating sequence will impose a corresponding different temporal polarization dependence on the output beam.

Configurations 400 and 500 are exemplary configurations, and various other suitable configurations can similarly be used to control the droplet's position, shape, light-diffusing properties, and/or light polarizing properties. Although configurations 400 and 500 have been described in reference to droplet 312 containing a conductive fluid and a liquid-crystal material, respectively, each of those configurations can also be used with other droplet compositions. A conductive fluid referred to in the context of FIG. 4 is not mutually exclusive with a liquid-crystal material referred to in the context of FIG. 5. In certain embodiments, the same chemical component of droplet 312 can, for example, serve as a conductive fluid and a liquid-crystal material at the same time. In one embodiment, droplet 312 can contain each of: (i) a conductive fluid, (ii) a suspension of particles, and (iii) a liquid-crystal material. Additional details on the electrode configurations, manufacture, and operation of various tunable liquid lenses suitable for implementing lens 320 can be found, e.g., in U.S. Pat. Nos. 6,014,259, 6,538,823, 6,545,815, 6,545,816, and 6,936,196 and a journal article by Krupenkin, et al., published in Applied Physics Letters, 2003, vol. 82, pp. 316-318, each of which is incorporated herein by reference in its entirety.

Figure 6:
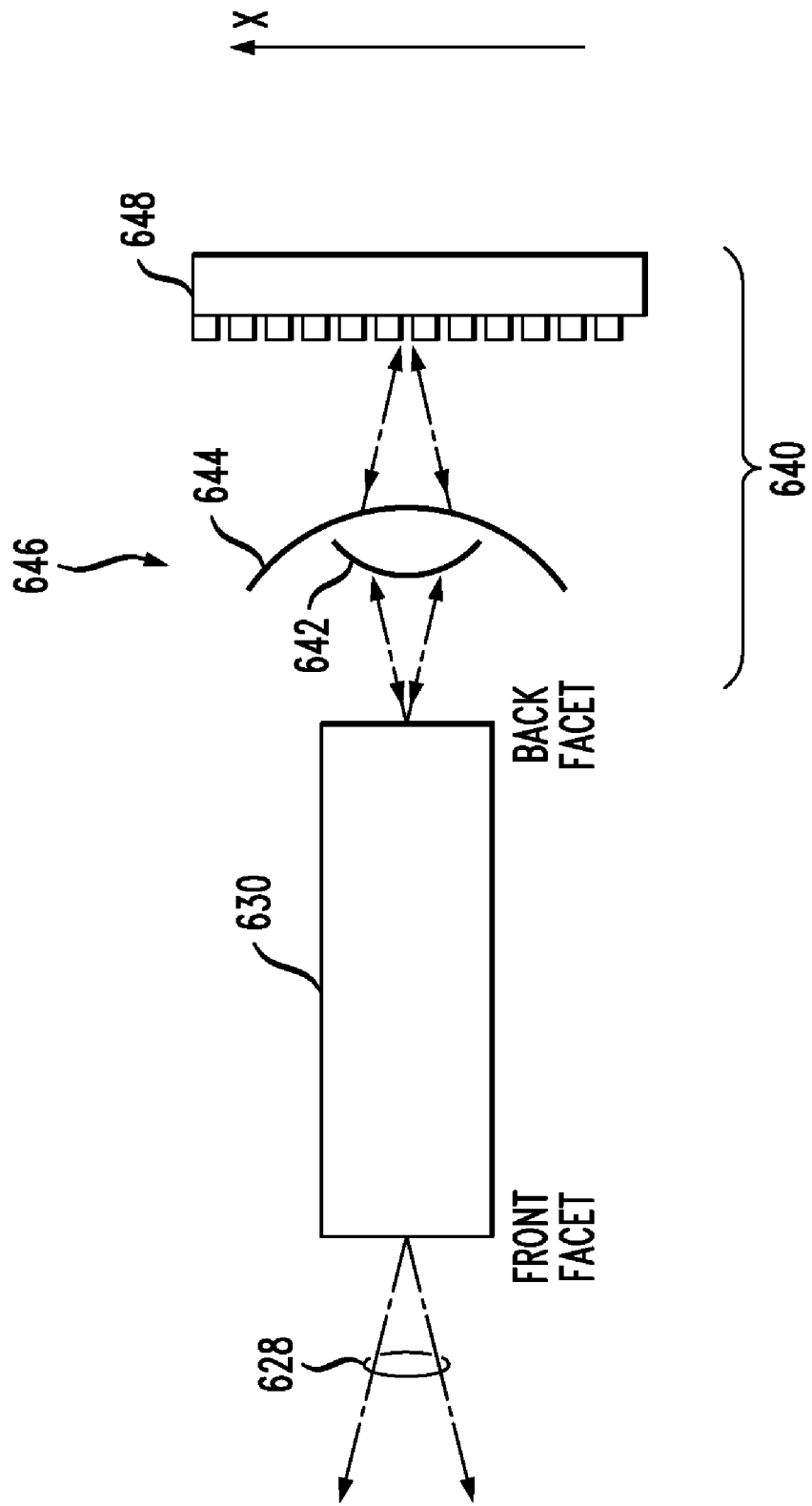
FIG. 6 shows a tunable laser that can be used in the projection system shown in FIG. 1 according to one embodiment of the invention.

FIG. 6 shows a tunable laser 610 that can be used as laser 110 according to one embodiment of the invention. Laser 610 has an optical gain block 630 optically coupled to a mode-selection filter (MSF) 640. MSF 640 has a tunable liquid lens 646 and a variable-pitch grating 648. In one embodiment, tunable liquid lens 646 is analogous to tunable liquid lens 320 (FIG. 3) and has a droplet 642 disposed on the surface of a support structure 644. Support structure 644 incorporates appropriate electrodes (not explicitly shown in FIG. 6) and can be flat or curved. The position of droplet 642 on support structure 644 can be changed, e.g., as described above in reference to FIG. 4. For example, droplet 642 is adapted to move on the surface of support structure 644 substantially along the X axis.

The pitch of grating 648 changes as one moves along the X axis. Grating 648 can have a flat or curved surface facing lens 646. Light exiting the back facet of gain block 630 is directed by lens 646 to grating 648. Position of droplet 642 with respect to the gain block controls the location at which the light strikes the grating. Grating 648 angularly disperses the light in accordance with the light's wavelength composition and the grating's pitch at that location, so that only light of certain wavelength couples back into gain block 630 through its back facet. The lasing mode having that wavelength is thereby selected and amplified in gain block 630 to generate an output beam 628. Thus, the wavelength of output beam 628 can be tuned by moving droplet 642 along the X axis.

In a typical configuration of laser 610, the motion amplitude of droplet 642 is selected to generate a wavelength change resulting in a color change that is indistinguishable to the human eye, and droplet 642 moves in a periodic or non-periodic manner at a rate higher than the flicker fusion rate. The varying position of droplet 642 creates wavelength diversity and produces a sequence of corresponding quasi-independent speckle configurations. Averaging of this sequence by the human eye then results in a corresponding speckle-contrast reduction.

Additional details on the design and operation of tunable lasers having mode-selection filters functionally analogous to MSF 640 can be found, e.g., in U.S. Pat. No. 6,647,029 and an article by J. A. Coldren, et al., entitled "Tunable Semiconductor Lasers: A Tutorial," published in J. Lightwave Technol., 2004, v. 22, No. 1, pp. 193-202, the teachings of both of which are incorporated herein by reference. Variable-pitch gratings suitable for use as grating 648 are commercially available, e.g., from OEpic, Inc., of Sunnyvale, Calif. Fabrication of variable-pitch gratings having curved surfaces is disclosed, e.g., in U.S. Pat. No. 4,012,843, which is incorporated herein by reference in its entirety.

In one embodiment, laser 610 can be used as laser 210 (FIG. 2). In that embodiment, light source 202 has two tunable liquid lenses, i.e., lens 220 and lens 646. In another embodiment, laser 610 can be used to replace laser 110, with lens 120 being a regular (solid) lens. In various embodiments, light sources of the invention can be designed and operated to produce any combination of one or more of the following diversities: angle diversity, polarization diversity, phase diversity, and wavelength diversity. As already indicated above, angle diversity can be produced, e.g., by (1) laterally moving droplet 312 on the surface of layer 314 and/or (2) agitating the particles contained in the droplet (see FIGS. 3-4). Polarization diversity can be produced, e.g., by having a liquid-crystal material in droplet 312 and changing the alignment direction of its molecules as described in reference to FIG. 5. Phase diversity can be produced, e.g., by changing the focal length of lens 320 as described in reference to FIG. 4. Wavelength diversity can be produced, e.g., by laterally moving droplet 642 on the surface of support structure 644 as described in reference to FIG. 6.

While this invention has been described with reference to illustrative embodiments, this description is not intended to be construed in a limiting sense. Although certain embodiments of the invention have been described in reference to projection system 100 (FIG. 1), the invention can also be practiced with other suitable projection systems, e.g., those employing the LCD technology. Any suitable imaging surface, including the eye's retina, can be used in place of screen 140. Embodiments of the speckle reduction method of the invention can be used separately or, as appropriate, in combination with other speckle reduction methods. For the purposes of this application, the term "spatial light modulator" encompasses any device or object that is capable of imposing an intensity and/or phase modulation pattern onto a beam of light. Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range herein should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Throughout the detailed description, the drawings, which are not to scale, are illustrative only and are used in order to explain, rather than limit the invention.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

What is claimed is:

1. An apparatus, comprising:
a light source; and
a spatial light modulator (SLM) adapted to modulate light generated by the light source so that the modulated light projects an image, wherein:
the light source comprises:
a tunable liquid lens; and
a laser adapted to transmit light through the tunable liquid lens; and
wherein the apparatus is adapted to vary at least one of characteristics of the tunable liquid lens to mitigate speckle in the projected image; and
wherein said at least one of the characteristics of the tunable liquid lens comprises one or more of: (i) an alignment or a lateral position of the tunable liquid lens with respect to an optical axis of the laser, (ii) an ability to diffuse light transmitted through the tunable liquid lens, and (iii) a polarization rotation angle imparted by the tunable liquid lens.

2. The invention of claim 1, wherein:
an output beam generated by the laser is directed through the tunable liquid lens to illuminate the SLM; and
said at least one of the characteristics of the tunable liquid lens further comprises a focal length.

3. The invention of claim 2, wherein said at least one of the characteristics of the tunable liquid lens comprises any two or more of: (i) a focal length, (ii) said alignment or said lateral position, (iii) the ability to diffuse light, and (iv) the polarization rotation angle.

4. The invention of claim 1, wherein said at least one of the characteristics of the tunable liquid lens comprises any three or more of: (i) a focal length, (ii) said alignment or said lateral position, (iii) the ability to diffuse light, and (iv) the polarization rotation angle.

5. The invention of claim 1, wherein
the laser comprises an optical gain block optically coupled to a variable-pitch grating via the tunable liquid lens, wherein an alignment or lateral position of the tunable liquid lens with respect to the optical gain block and the variable-pitch grating controls a wavelength of light generated by the light source.

6. The invention of claim 1, wherein the tunable liquid lens comprises a droplet disposed on a surface of a support structure.

7. The invention of claim 6, wherein:
the droplet comprises an electrically conducting fluid; and
the tunable liquid lens further comprises a plurality of electrodes adapted to be electrically biased to control at least one of (i) shape of the droplet and (ii) a lateral position of the droplet on the support structure.

8. The invention of claim 6, wherein:
the droplet comprises a suspension of particles; and
the tunable liquid lens further comprises a transducer adapted to agitate the particles within the droplet to vary light-diffusing properties of the suspension.

9. The invention of claim 6, wherein:
the droplet comprises a liquid-crystal material; and
the tunable liquid lens further comprises a plurality of electrodes adapted to vary a polarization rotation caused by the liquid-crystal material.

10. A method of reducing speckle, comprising:
illuminating a spatial light modulator (SLM) with light generated by a light source, wherein the light source comprises:
a tunable liquid lens; and
a laser that transmits light through the tunable liquid lens;
modulating the illuminating light with the SLM so that the modulated light projects an image; and
varying at least one of characteristics of the tunable liquid lens to mitigate speckle in the projected image, wherein said at least one of the characteristics of the tunable liquid lens comprises one or more of: (i) an alignment or a lateral position of the tunable liquid lens with respect to an optical axis of the laser, (ii) an ability to diffuse light transmitted through the tunable liquid lens, and (iii) a polarization rotation angle imparted by the tunable liquid lens.

11. The invention of claim 10, further comprising directing an output beam generated by the laser through the tunable liquid lens to illuminate the SLM, wherein:
said at least one of the characteristics of the tunable liquid lens further comprises a focal length.

12. The invention of claim 10, wherein
the laser comprises an optical gain block optically coupled to a variable-pitch grating via the tunable liquid lens, wherein an alignment or lateral position of the tunable liquid lens with respect to the optical gain block and the variable-pitch grating controls a wavelength of light generated by the light source.

13. The invention of claim 10, wherein the tunable liquid lens comprises a droplet disposed on a surface of a support structure.

14. The invention of claim 13, wherein:
the droplet comprises an electrically conducting fluid;
the tunable liquid lens further comprises a plurality of electrodes; and
the step of varying comprises electrically biasing one or more electrodes of the plurality to control at least one of (i) shape of the droplet and (ii) a lateral position of the droplet on the support structure.

15. The invention of claim 14, wherein:
the step of varying further comprises varying a focal length of the tunable liquid lens.

16. The invention of claim 14, wherein:
the step of varying further comprises moving the droplet with respect to the support structure.

17. The invention of claim 13, wherein:
the droplet comprises a suspension of particles;
the tunable liquid lens further comprises a transducer; and
the step of varying comprises agitating the particles within the droplet using the transducer to vary light-diffusing properties of the suspension.

18. The invention of claim 13, wherein:
the droplet comprises a liquid-crystal material;
the tunable liquid lens further comprises a plurality of electrodes; and
the step of varying comprises electrically biasing one or more electrodes of the plurality to vary a polarization rotation caused by the liquid-crystal material.

19. The invention of claim 18, wherein:
the step illuminating comprises directing a laser beam through the tunable liquid lens to the SLM; and
the step of varying comprises rotating a polarization of the laser beam transmitted through the tunable liquid lens.

20. An apparatus, comprising:
a light source having a tunable liquid lens; and
a spatial light modulator (SLM) adapted to modulate light generated by the light source so that the modulated light projects an image on an imaging surface, wherein:
the tunable liquid lens is adapted to vary at least one of the lens' characteristics to mitigate speckle in the projected image;
the tunable liquid lens comprises a droplet disposed on a surface of a support structure, wherein the droplet comprises a liquid-crystal material; and
the tunable liquid lens further comprises a plurality of electrodes adapted to vary a polarization rotation caused by the liquid-crystal material.

* * * * *

UNITED STATES PATENT AND TRADEMARK OFFICE
CERTIFICATE OF CORRECTION

| | |
|---|---|
| PATENT NO. | : 7,862,183 B2 |
| APPLICATION NO. | : 11/872751 |
| DATED | : January 4, 2011 |
| INVENTOR(S) | : Robert E. Frahm and Omar D. Lopez |

It is certified that error appears in the above-identified patent and that said Letters Patent is hereby corrected as shown below:

Column 9, line 46, the phrase "The invention of claim 2," should read --The invention of claim 1,--.

Signed and Sealed this
Twenty-second Day of February, 2011

David J. Kappos
*Director of the United States Patent and Trademark Office*